(12) United States Patent
Foubert et al.

(10) Patent No.: US 12,097,517 B2
(45) Date of Patent: Sep. 24, 2024

(54) DEVICE FOR MEASURING A MASS OF A BODY AND ASSOCIATED METHODS

(71) Applicant: EXEL INDUSTRIES, Epernay (FR)

(72) Inventors: Guillaume Foubert, Paris (FR); Hervé Brochier-Cendre, Paris (FR); Eric Ghio, Paris (FR)

(73) Assignee: EXEL INDUSTRIES, Epernay (FR)

( * ) Notice: Subject to any disclaimer, the term of this patent is extended or adjusted under 35 U.S.C. 154(b) by 196 days.

(21) Appl. No.: 17/602,013

(22) PCT Filed: Apr. 17, 2020

(86) PCT No.: PCT/EP2020/060810
§ 371 (c)(1),
(2) Date: Oct. 7, 2021

(87) PCT Pub. No.: WO2020/212548
PCT Pub. Date: Oct. 22, 2020

(65) Prior Publication Data
US 2022/0143644 A1 May 12, 2022

(30) Foreign Application Priority Data

Apr. 19, 2019 (FR) ...................................... 1904225

(51) Int. Cl.
*B05B 13/02* (2006.01)
*B05B 7/00* (2006.01)
(Continued)

(52) U.S. Cl.
CPC ........ *B05B 13/0214* (2013.01); *B05B 7/0093* (2013.01); *B05B 7/1445* (2013.01);
(Continued)

(58) Field of Classification Search
CPC . B05B 13/0214; B05B 7/0093; B05B 7/1445; G01F 22/00; G01F 23/2966; G01F 23/22; G01F 23/28; G01G 19/00
(Continued)

(56) References Cited

U.S. PATENT DOCUMENTS

| 4,579,482 A | 4/1986 | Gastaldi et al. |
| 4,908,776 A | 3/1990 | Crill et al. |

(Continued)

FOREIGN PATENT DOCUMENTS

| EP | 2765399 A1 | 8/2014 |
| JP | 6239725 A | 2/1987 |

(Continued)

OTHER PUBLICATIONS

INPI Rapport de Recherche Préliminaire for Patent Application No. FR 1904225, Dec. 12, 2019, 2 pp.
(Continued)

*Primary Examiner* — Alesa Allgood
*Assistant Examiner* — Byung Ro Lee
(74) *Attorney, Agent, or Firm* — Soquel Group LLC

(57) ABSTRACT

A device for measuring a mass of a body, the device including a support suitable for supporting the body, a frame and an actuator designed to vibrate the support relative to the frame. The device includes an accelerometer designed to measure values of an acceleration of the support upon vibration of the support, and an electronic control module designed to estimate the mass of the support body from the measured acceleration values.

17 Claims, 4 Drawing Sheets

(51) Int. Cl.
*B05B 7/14* (2006.01)
*G01F 22/00* (2006.01)
*G01F 23/296* (2022.01)
*G01G 19/00* (2006.01)

(52) U.S. Cl.
CPC .......... *G01F 22/00* (2013.01); *G01F 23/2966* (2013.01); *G01G 19/00* (2013.01)

(58) Field of Classification Search
USPC .......................................................... 702/54
See application file for complete search history.

(56) References Cited

U.S. PATENT DOCUMENTS

| | | | |
|---|---|---|---|
| 5,662,272 A * | 9/1997 | Buquet | ................... B05B 7/144 239/654 |
| 5,736,054 A | 4/1998 | Feller et al. | |
| 2003/0006250 A1 | 1/2003 | Tapphorn et al. | |
| 2005/0149277 A1 | 7/2005 | Bailey et al. | |
| 2016/0265960 A1 | 9/2016 | Watanabe | |

FOREIGN PATENT DOCUMENTS

| | | | |
|---|---|---|---|
| JP | 5286323 | A | 11/1993 |
| JP | 8152352 | A | 6/1996 |
| JP | 961226 | A | 3/1997 |
| WO | 2015060319 | A1 | 4/2015 |

OTHER PUBLICATIONS

International Search Report for Patent Application No. PCT/EP2020/060810, May 29, 2020, 3 pp.
Abstract Machine translation for JP Publication No. 5286323.
Abstract Machine translation for JP Publication No. 6239725.
Abstract Machine translation for JP Publication No. 961226.
Abstract Machine translation for JP Publication No. 8152352.

* cited by examiner

DEVICE FOR MEASURING A MASS OF A BODY AND ASSOCIATED METHODS

CROSS-REFERENCE TO RELATED APPLICATIONS

This application claims benefit under 35 USC § 371 of PCT Application No. PCT/EP2020/060810 entitled DEVICE FOR MEASURING A MASS OF A BODY, AND ASSOCIATED METHODS, filed on Apr. 17, 2020 by inventors Guillaume Foubert, Hervé Brochier-Cendre and Eric Ghio. PCT Application No. PCT/EP2020/060810 claims priority of French Patent Application No. 19 04225, filed on Apr. 19, 2019.

FIELD OF THE INVENTION

The present invention relates to a device for measuring the mass of a body. The present invention also relates to an associated measurement method as well as a method for spraying an associated product.

BACKGROUND OF THE INVENTION

In many applications, it may be desirable to measure the mass of bodies which are subjected to vibrational movement.

For example, installations for spraying products, in particular coating products, generally comprise a sprayer intended to spray the product, for example on one or more parts to be covered, as well as a reserve of the product connected to the sprayer by one or several pipes. Such installations are used in particular for spraying these products in the form of fluids such as liquids, or powders.

In some cases, the products thus sprayed are not very fluid and tend to homogenize poorly in the reserve. For example, some very viscous liquids or powders tend not to immediately fill the space freed by the product which has left the reserve to be sprayed. Thus, it may happen that the end of the pipe sucking the product to lead it to the sprayer is found at least partially surrounded by an empty zone while the reserve is not empty, since the product sucked has not been replaced in the suction zone by product from the rest of the reserve. An unwanted variation in the spray rate then occurs, which may go as far as an interruption of the supply to the sprayer with product to be sprayed.

In order to avoid such a phenomenon from occurring, it is known practice to mechanically vibrate the reserve during spraying, so as to facilitate the movement of the product in the reserve and therefore its homogenization. Thus, the supply of the spray product to be sprayed to the sprayer is prevented from fluctuating or even being interrupted. Such vibrations are used in particular for powder spraying installations.

Furthermore, it is desirable that the operator of the installation should be able to easily assess the quantity of product remaining in the reserve, in order to facilitate the organization of work and above all to be able to fill the reserve in good time so as to avoid another unexpected interruption of the supply to the sprayer with product to be sprayed. To this end, it is known that an installation for spraying fluid, in particular powders, comprises a balance making it possible to evaluate the mass of the reserve, and therefore the estimate the quantity of remaining product.

In other cases, installations include containers in which products such as agro-food or chemical products are stirred, for example in the context of the preparation of a product transformed from these products or in order to facilitate the product flow from the container to another part of the installation.

A powder distribution unit, capable of automatically supplying one or more other installations with powder, is another example of an installation subjected to vibrations and for which the mass of a body, here the quantity of powder remaining, must be measured.

However, the measurement of the mass of a vibrating body is made very imprecise by the mechanical vibrations to which the body is subjected. For example, when mass is determined from the measurement of a displacement caused by the action of the body's weight on a spring or other biasing member, the vibration continuously varying the value of that displacement.

There is therefore a need for a device for measuring the mass of a vibrating body which is more precise than the measuring devices of the prior art.

SUMMARY OF THE DESCRIPTION

To this end, a device is proposed for measuring a mass of a body, the device comprising a support suitable for supporting the body, a frame and an actuator designed to make the support vibrate relative to the frame, the device comprising an accelerometer designed to measure values of an acceleration of the support upon vibration of the support and an electronic control module designed to estimate the mass of the body from the measured acceleration values.

According to particular embodiments, the device comprises one or more of the following characteristics, taken in isolation or in any technically feasible combination:

the control module is designed to calculate speed values of the support relative to the frame from the measured acceleration values, and to estimate the mass of the body from the calculated speed values.

the control module is designed to determine a vibration frequency of the support relative to the frame from the measured acceleration values, and to estimate the mass of the body from the determined vibration frequency.

the control module is designed to determine the vibration frequency from the calculated speed values.

the control module is designed to compare the determined vibration frequency with at least a first predetermined threshold, and to estimate the mass of the body as a function of the comparison.

the control module is designed to generate, when the frequency is greater than or equal to said at least one first threshold, a signal intended for a user of the device.

the control module is designed to compare the determined vibration frequency with a plurality of first predetermined thresholds, and to estimate the mass of the body as a function of each comparison.

the control module is designed to calculate values of the coefficients of a Fourier transform from the calculated speed values, and to determine the vibration frequency from the calculated coefficient values.

the control module is designed to apply frequency bandpass filtering to the calculated speed values, calculate the values of coefficients of a Fourier transform of the filtered speed values, compare an absolute value of each calculated coefficient value to a second predetermined threshold, and estimate the mass, in particular to generate a signal for a user, based on the result of the comparison.

the actuator is designed to move the support in a direction relative to the frame when the actuator vibrates the support, the accelerometer being designed to measure acceleration values of the support in said direction.

the body is a reserve of a product, the device further comprising a projector designed to receive a flow of the product from the reserve and to project the received product, the product being in particular a powder.

A method is also proposed a for measuring a mass of a body, implemented by a measuring device comprising a support supporting the body, a frame and an actuator designed to make the support vibrate relative to the frame, the method comprising steps of:

vibration, by the actuator, of the support relative to the frame, measurement of the values of an acceleration of the support during vibration, and estimation, by an electronic control module, of the mass of the body from the measured acceleration values.

A method of spraying a product is also proposed, implemented by a device as defined above, the support supporting a reserve of the product, the product being in particular a powder, the method comprising steps of:

circulation of the product from the reserve to the sprayer, projection, by the sprayer, of the product received, and implementation of a method for measuring the mass of a body as defined above, the body being the reserve of the product.

BRIEF DESCRIPTION OF THE DRAWINGS

Characteristics and advantages of the invention will become apparent upon reading the description which follows, given solely by way of non-limiting example, and made with reference to the accompanying drawings, in which.

DETAILED DESCRIPTION OF EMBODIMENTS

Figure 1:
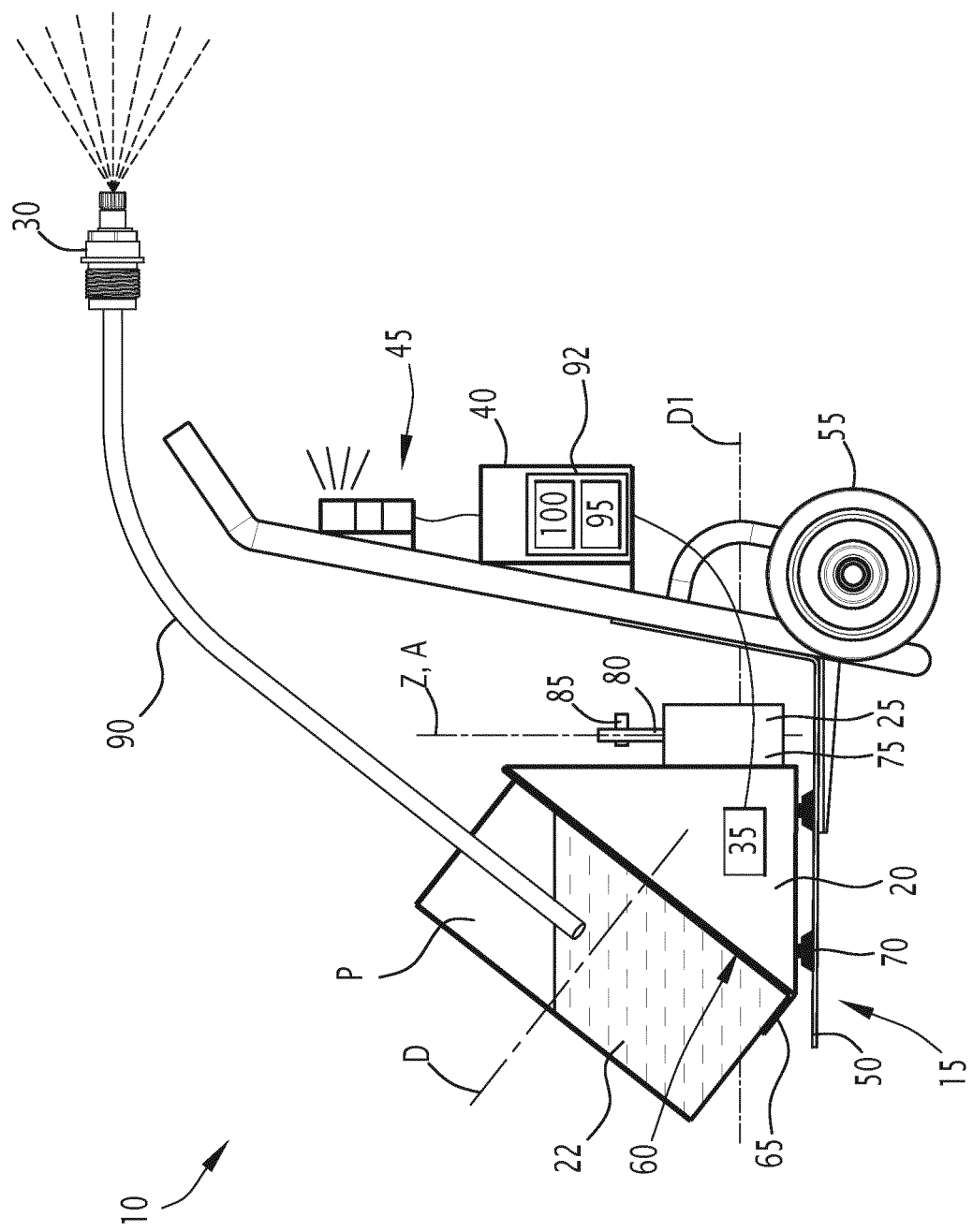
FIG. 1 is a schematic representation of an example of a device according to the invention.

A first example of a device 10 for measuring a mass of a body 22 is shown in FIG. 1.

The device comprises a frame 15, a support 20 designed to support the body 22, an actuator 25, an accelerometer 35, a control module 40 and an indicator 45.

The device 10 will be described below in the case where the device 10 is a device for spraying a product P. In this case, the spraying device 10 further comprises a sprayer 30. In addition, the body 22 is, for example, a reserve of the product P.

It should be noted that variants of the device 10 in which the device 10 is not a device for spraying a product P are also possible. In this case, the device 10 does not include a sprayer 30.

The projection device 10 is designed to pray a product P, in particular a coating product such as a paint or a varnish.

Product P is, for example, in powder form. For example, product P is a coating product in powder form, capable of being melted to form a layer of coating product on the surface of a part when the part is heated with a layer of the powder.

The frame 15 is, for example, designed to support the support 20, the body 22, the actuator 25, the control module 40 and the indicator 45. However, embodiments in which at least one element of the support 20, the body 22, the actuator 25, the control module 40 and the indicator 45 is not supported by the frame 15, are also possible.

The frame 15 comprises, for example, a chassis 50, in particular metal, and wheels 55, as well as a gripping member 60, in particular a handle, suitable for allowing a user to move the device 10.

As a variant, the frame 15 is a fixed frame, for example a concrete slab, or any other type of fixed frame.

The support 20 is designed to support the body 22. Thus, the frame 15 supports the body 22 through the support 20.

The support 20 is, for example, made of a metallic material. As a variant, the support 20 may be made at least partially of a plastic material, for example of a composite material.

The support 20 comprises, for example, a support face 60, and optionally one or more shims 65, also called wedges.

The support 20 is movable relative to the frame 15. In particular, the support 20 is designed to fill, at rest and in the absence of external mechanical stress, a position of equilibrium with respect to the frame 15, and to be moved by the actuator 25 towards at least one position different from the equilibrium position.

The support 20 is, for example, connected to the frame 15 by one or more dampers 70, made in particular of an elastomeric material. Each damper 70 is, for example, interposed in the vertical direction between the frame 15 and the support 20. In this case, the deformation of the damper(s) 70 allows a relative movement of the support 20 with respect to the frame 15.

As a variant, the support 20 may be suspended from the frame 15 via the damper(s) 70. According to another variant, the support 20 is mounted on the frame 15 via a pivot connection or by another type of mechanical connection allowing relative movement of the support. 20 relative to the frame 15.

The support face 60 is provided to support the body 22.

The support face 60 is, for example, flat.

According to the example shown, the support face 60 forms, when the device 10 is in operation, an angle greater than or equal to 10 degrees (°) with the horizontal. For example, a normal direction D, perpendicular to the support face 60, forms an angle greater than or equal to 10° relative to a vertical direction Z.

In particular, the angle between the normal direction D and the vertical direction Z is between 85 degrees (°) and 95°.

As a variant, the support face 60 is may be a horizontal face.

The shim(s) 65 are designed to prevent movement of the body 22 from a position in which the body 22 is supported by the support face 60 to a position where the body 22 is not supported by the support face 60. In particular, each shim 65 is disposed on a periphery of the support face 60 and forms a protuberance from the support face 60. For example, each shim 65 is disposed at a lower end of the support face 60, when the latter forms an angle with the horizontal. In this case, each shim 65 is able to prevent the body 22 from falling from the support face 60 under the effect of gravity.

The body 22 is supported by the support 20.

The body 22 is, in particular, removable from the support 20. For example, the body 22 may be placed on the support face 60.

As a variant, the body 22 may be fixed to the support 20. For example, the body 22 may be suspended from the support 20, for example via hooks, or else fixed to the support 20 by snap-fastening.

According to another variant, the body 22 may be integral with the support 20.

It should be noted that the support 20 and the body 22 are likely to take many forms.

A mass of the body 22 is likely to weigh between, for example, 0 kilogram (kg) and 25 kg.

When the device 10 is a product spraying device P, the body 22 is a reserve of the product P. In other words, the body 22 contains the product P. The body 22 is, for example, a container such as a barrel, a box, or even a bottle. When the body 22 is integral with the support 20, the body 22 is formed by a hollow part of the support 20, which is intended to be filled with the product P.

The actuator 25 is designed to vibrate the support 20 relative to the frame 15. In particular, the actuator 25 is designed to jointly vibrate the support 20 and the body 22 which is supported by the support 20, when this body is present.

The term "vibrating" is understood in particular to mean a periodic or pseudo-periodic movement of the support 20 relative to the frame 15. In other words, the vibration is an oscillation. The vibration has, for example, a first temporal frequency between 0 Hertz (Hz) and 100 Hz, in particular between 40 Hz and 60 Hz.

The actuator 25 is designed to exert on the support 20 a periodic force having a second frequency. The force tends to move the support 20 relative to the frame 15.

The second frequency is, for example, between 10 Hertz (Hz) and 100 Hz, in particular between 40 Hz and 60 Hz.

It is to be noted that the second frequency is likely to be different from the first frequency. In particular, due to the inertia of the support 20 and of the body 22, the force exerted by the actuator 25, which has the second frequency, causes vibration of the support 20 and of the body 22 with a first frequency that is different from the second frequency. The first frequency is, in particular, a natural frequency of the assembly formed by the support 20, the body 22 and the element(s), such as the actuator 25 in the embodiment shown in FIG. 1, which are integral with the support 20 and the body 22.

A natural frequency of an object or a set of objects is in particular a frequency at which the object or the set of objects is capable of vibrating naturally in the absence of external constraints. For example, if the object or the set of objects is moved out of a position of equilibrium and then left free to move until having dissipated the energy excited by this initial displacement, the object or the set of objects will naturally adopt a pseudoperiodic movement about its position of equilibrium, at one of its natural frequencies, until finally returning to its position of static equilibrium.

An object or set of objects is likely to have several natural frequencies corresponding in particular to different movements.

The first frequency, like natural frequencies generally, is a function of the mass of the support 20 and of the body 22.

The movement of the support 20 during the vibration is, for example, a movement in a plane perpendicular to the vertical direction Z. As a variant, the movement may be a movement in the vertical direction Z.

The actuator 25 may be, for example, integral with the support 20, in particular supported by, in particular suspended from, the support 20.

The actuator 25 comprises, for example, a motor 75, in particular an electric motor, a shaft 80 and a ballast 85.

The motor 75 is designed to rotate the shaft 80 about its axis A. For example, the motor 75 is designed to rotate the shaft 80 about its axis A with a frequency between 10 Hz and 100 Hz, in particular between 40 Hz and 60 Hz.

The ballast 85 is attached to shaft 80.

The ballast 85 has a center of gravity. A distance between the axis A and the center of gravity is distinctly greater than zero. For example, the distance may be between 5 millimeters (mm) and 500 mm.

Thus, during the rotation of the shaft 80, the center of gravity of the ballast 85 is set in motion. In other words, the ballast forms an unbalance during the rotation of the shaft 80. A force then appears tending to vibrate the actuator 25, and therefore also the support 20.

Alternatively, the actuator 25 may be interposed between the frame 15 and the support 20, and designed to exert on the frame 15 and on the support 20 a periodic force tending to vibrate the support 20 relative to the frame 15.

The sprayer 30 is designed to receive a flow of the product P from the body 22 and to project the product P, for example onto a part that the user wishes to cover with the product P.

The sprayer 30 may be, for example, an electrostatic sprayer capable of imposing an electrical potential difference between the sprayer 30 and the part to be covered.

The sprayer 30 may be, for example, connected to the body 22 by a pipe 90 and designed to suck product P via the pipe 90.

The accelerometer 35 is designed to measure acceleration values of the carrier 20. For example, the accelerometer 35 may be integral with the support 20 and designed to measure values of an acceleration of the accelerometer 35.

The accelerometer 35 may be, for example, designed to measure the acceleration values with a temporal measurement frequency between 35 Hertz (Hz) and 50 Hz. In particular, a temporal interval between two temporal instants corresponding to two successive measured values is constant. In other words, the measurement frequency is constant. As a variant, the measurement frequency may be variable.

The accelerometer 35 may be, for example, designed to measure values of an acceleration of the support 20 in a single direction D1.

Preferably, the direction D1 is a direction in which an amplitude of the movement of the support 20 during vibration is greater than or equal to the amplitudes of the movement of the support 20 in the other directions.

In particular, the direction D1 is a direction such that the actuator 25 is designed to exert on the support 20 a force tending to move the support 20 relative to the frame 15 in this direction.

The direction D1 may be, for example, a direction perpendicular to the axis A of the shaft 80.

Alternatively, the accelerometer 35 may be designed to measure acceleration values of the support 20 in two distinct directions, particularly in two directions perpendicular to each other. For example, the accelerometer 35 may be designed to measure acceleration values of the support 20 in two directions perpendicular to the axis A.

The accelerometer 35 is designed to transmit the measured acceleration values to the control module 40. For example, the accelerometer 35 may be connected to the control module 40 via a wired link, or else designed to communicate with the control module 40 via radiofrequency waves.

The control module 40 is designed to estimate a mass of the body 22, in particular a mass of product P in the body 22, from at least the acceleration values measured by the accelerometer.

For example, the control module 40 may be designed to generate a signal, for example a signal to the user, dependent on the mass of the body.

In particular, the control module 40 may be designed to determine, from at least the measured acceleration values, the first frequency, and to estimate the mass from the first determined frequency.

It should be noted that according to possible variants, the control module 40 may be designed to estimate the mass of the reserve 22 from a parameter other than the first frequency, for example from an absolute value of at least one acceleration value, for example by comparing the absolute value to a threshold.

The control module 40 comprises, for example, a calculation module, a determination module, and an estimation module.

The control module 40 comprises, in particular, a data processing unit 92 comprising a processor 95 and a memory 100, in which software instructions are stored. When the software instructions are executed by the processor 95, the calculation module, the determination module and the estimation module are formed.

As a variant, the calculation module, the determination module and the estimation module are made in the form of dedicated integrated circuits, or else of programmable logic circuits.

The control module 40 is designed to calculate speed values of the support 20 from the measured acceleration values, and to estimate the mass from the calculated speed values. For example, the control module 40, in particular the calculation module, may be designed to calculate the speed values by temporal integration of the measured acceleration values.

The control module 40 may be, in particular, designed to calculate the speed values of the support 20 and to determine the first frequency from the calculated speed values. The determination of the first frequency is, in particular, carried out by the determination module.

As a variant, the control module 40, in particular the determination module, is designed to estimate the mass of the body 22 from an absolute value of at least one calculated speed value, for example from the result of the comparison of the absolute value with a predetermined threshold.

The control module 40, in particular the determination module, is designed to calculate the values of the coefficients of a Fourier transform. The Fourier transform is, for example, a Fourier transform of the calculated speed values.

As a variant, the Fourier transform may be a Fourier transform of the measured acceleration values, or of the displacement values of the support 20 relative to the frame. The displacement values are, in particular, values of a distance of the support 20 from the equilibrium position. The displacement values are, for example, calculated by the control module 40 from the measured acceleration values, in particular by temporal integration of the calculated speed values.

The control module 40 may be, for example, designed to calculate the values of coefficients by fast Fourier transform. The fast Fourier transform, often referred to by the acronym FFT, is an algorithm for calculating a discrete Fourier transform.

The control module 40 is designed, in a manner known per se, to determine the first frequency from the calculated coefficients.

The control module 40, in particular, the estimation module, is designed, for example, to estimate the mass of the body 22 based on a comparison of the first frequency with at least one predetermined frequency threshold. In particular, the control module 40 is designed to estimate the mass of the body 22 based on a comparison of the first frequency with a plurality of frequency thresholds.

For example, the estimation module may be designed to compare the first frequency with a first frequency threshold and with a second frequency threshold distinctly greater than the first frequency threshold.

The control module 40 may be, for example, designed to generate a first signal if the first frequency is greater than or equal to the first frequency threshold. The first signal may be, in particular, a signal intended to inform the user that the mass of the body 22 is less than or equal to a first mass value.

The first frequency threshold is, for example, between 47 Hz and 50 Hz. For example, the first mass value is equal to zero, corresponding in particular to an empty reserve.

As an optional addition, the control module 40 may be designed to generate a second signal if the first frequency is distinctly less than the first threshold and greater than or equal to the second threshold.

Each signal generated by the control module 40 is, in particular, generated by the estimation module.

The second signal is, in particular, a signal intended to inform the user that the estimated mass is distinctly greater than the first mass value and less than or equal to a second mass value.

The second mass value is, for example, equal to 25 kg.

The second threshold is, for example, between 37 Hz and 41 Hz.

Optionally, the control module 40 may be further designed to generate a third signal if the first frequency is distinctly below the second threshold. The third signal is, in particular, a signal intended to inform the user that the mass of the body 22 is greater than or equal to the second mass value.

The control module 40 is designed to transmit the first, second or third signal to the indicator 45.

For example, the control module 40 may be designed to estimate the mass of the body 22 within a period of time, and to send a signal to the user, in particular the first, second or third signal, within said period of time.

The indicator 45 is designed to convert the signal received from control module 40 into a signal understandable by the user.

For example, the indicator 45 may be designed to emit a visual signal dependent on the received signal. The visual signal may be, for example, an on or off lamp.

In one embodiment, the indicator 45 is designed to light one of three lamps depending on whether the first signal, the second signal, or the third signal is received.

Alternatively, the indicator 45 may be designed to emit an audible signal based on the received signal.

Figure 2:
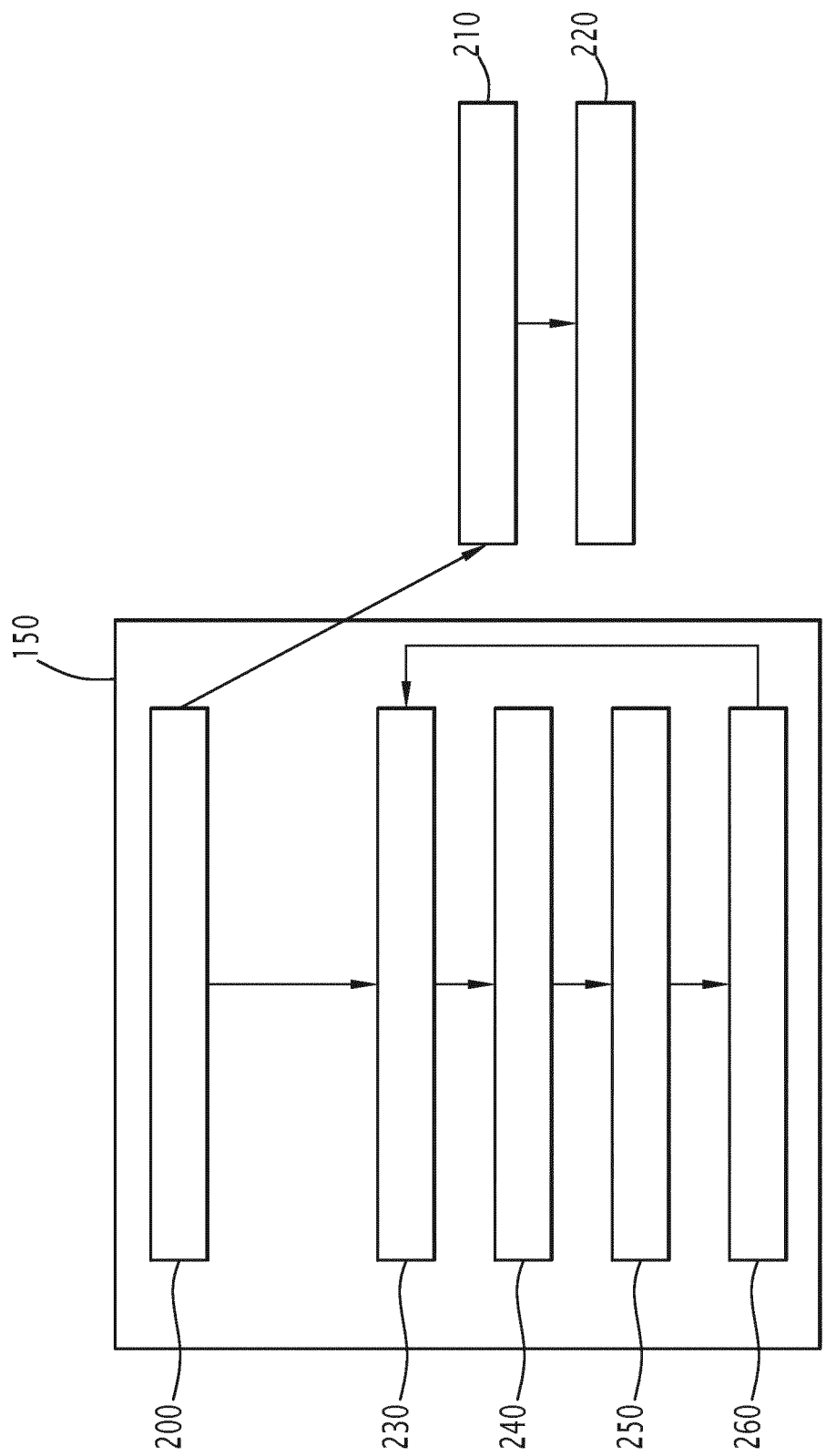
FIG. 2 is a flowchart of the steps of a product spraying method, implemented by the device of FIG. 1.

The operation of the device 10 will now be described with reference to FIG. 2, which is a flowchart of the steps of a method 150 for measuring the mass of the body 22 implemented by the device 10.

The measurement method 150 comprises a vibration step 200, a measurement step 230, a calculation step 240, an estimation step 250 and a signaling step 260.

For example, the measurement method 150 may be integrated into a method for spraying the product P, which is described below. The spraying method further comprises a circulation step 210 and a spraying step 220.

During the vibration step 200, the actuator 25 vibrates the support 20 and the body 22 relative to the frame 15. For example, the user turns on the actuator 25.

The vibration movement is, in particular, maintained during the circulation step 210, the spraying step 220, the measurement step 230, the calculation step 240, the estimation step 250 and the signaling step 260.

During the circulation step 210, the product P circulates in the pipe 90 from the body 22 to the sprayer 30. The product P received by the sprayer 30 is sprayed by the sprayer 30, for example on a part that the user wishes to cover at least partially with the product P during the spraying step 220.

The measuring step 230 comprises measuring at least one acceleration value of the support 20 by the accelerometer 35. For example, a single acceleration value may be measured. Alternatively, acceleration values may be measured at successive temporal instants, with the measurement frequency.

The measured acceleration values are transmitted to the control module 40.

The calculation step 240 comprises the calculation of speed values from the measured acceleration values, by the control module 40.

The speed values are calculated by integrating the acceleration values over time.

During the estimation step 250, the control module 40 estimates the mass of the body 22 from the acceleration values, in particular from the speed values.

In particular, the control module 40 determines the first frequency from the calculated speed values, and estimates the mass from the first determined frequency.

The control module 40 determines in particular the first frequency from values of coefficients of a Fourier transform of the speed values.

The control module 40 in particular compares the first frequency at least with the first frequency threshold, optionally with the second frequency threshold, and generates a message to the user based at least on the result of the comparison.

For example, the control module 40 generates the first, second or third message according to the result of the comparison.

The generated message is transmitted to the indicator 45 in signaling step 260. The indicator then converts the message generated by the control module 40 into a user-understandable message.

The measurement step 230, the calculation step 240, the estimation step 250 and the signaling step 260 are, in particular, repeated in this order during the vibration step 200, the circulation step 210, and the spraying step 220.

Thanks to the invention, the mass of the body 22 is estimated more precisely than by the devices of the prior art. In fact, the acceleration measurements are not impacted by the vibration of the support 20 and the body 22 as can the mass measurements by scales.

Due to the mass values and the first and second frequencies generally used, the speed of movement of the support 20 varies significantly when the mass of the body 22 decreases during the operation of the device 10. The estimation of the mass from the speed values is therefore more precise than directly from the acceleration values The estimation of mass from the frequency of vibration is also particularly accurate. In fact, the vibration frequency (i.e. the first frequency) depends on the mass of the assembly formed by the body 22 and by the support 20, and is likely to vary significantly between a configuration where the body 22 is filled with product P and a configuration where the body 22 is empty.

Figure 3:
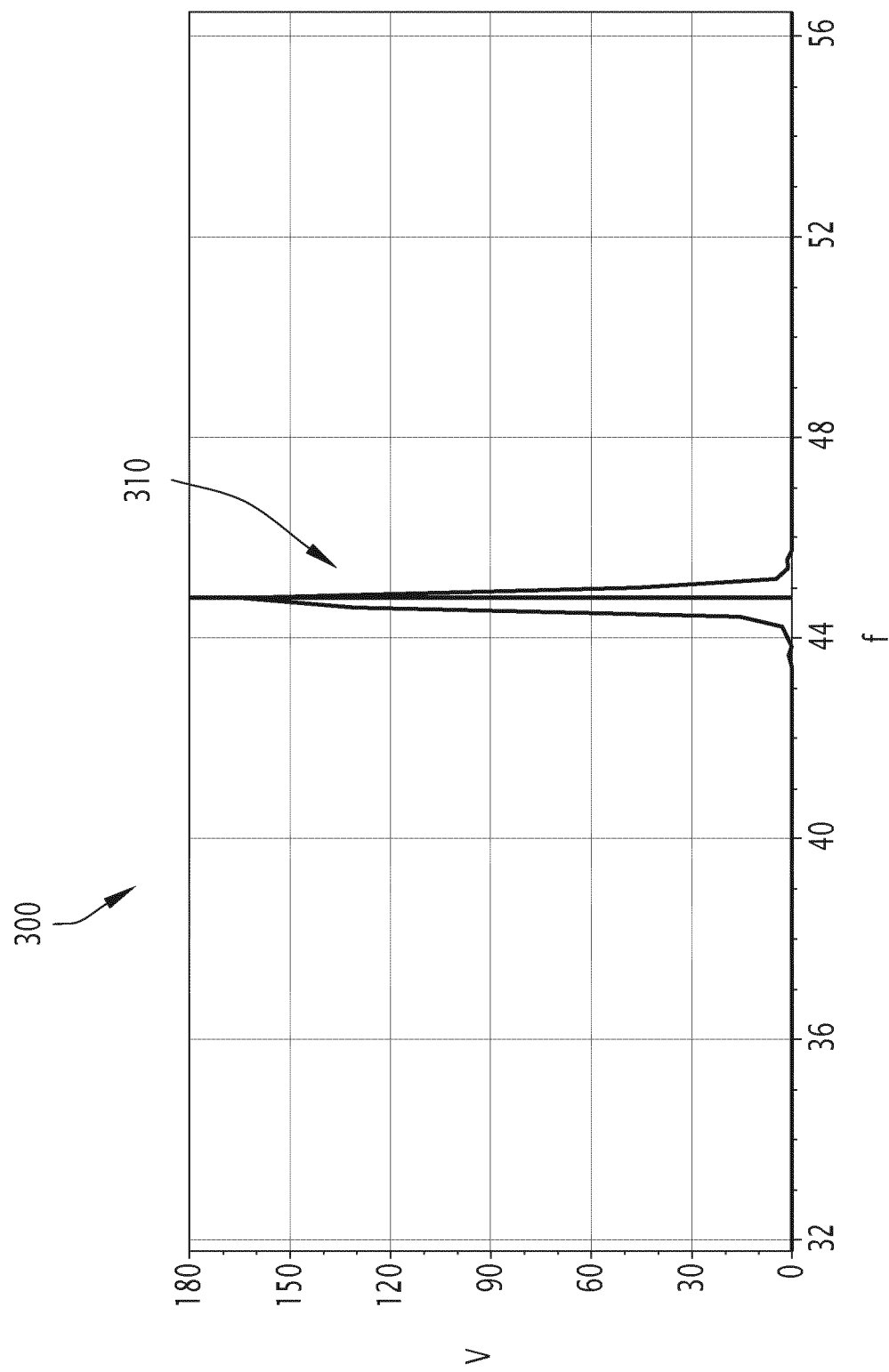
FIG. 3 is an example of a frequency spectrum measured during the method of FIG. 2.

For example, a first example of the frequency spectrum 300 representing the speed values v (in millimeters per second) calculated as a function of the associated frequency f (in hertz) is shown in FIG. 3. This first example of the spectrum 310 corresponds to a body 22 placed on the support 20 and having a mass of 5 kilograms. There is a peak 310 entered around a frequency of 44.82 Hz. It is deduced that, when the first frequency is equal to 44.82 Hz, the mass of the body 22 is equal to 5 kilograms.

Figure 4:
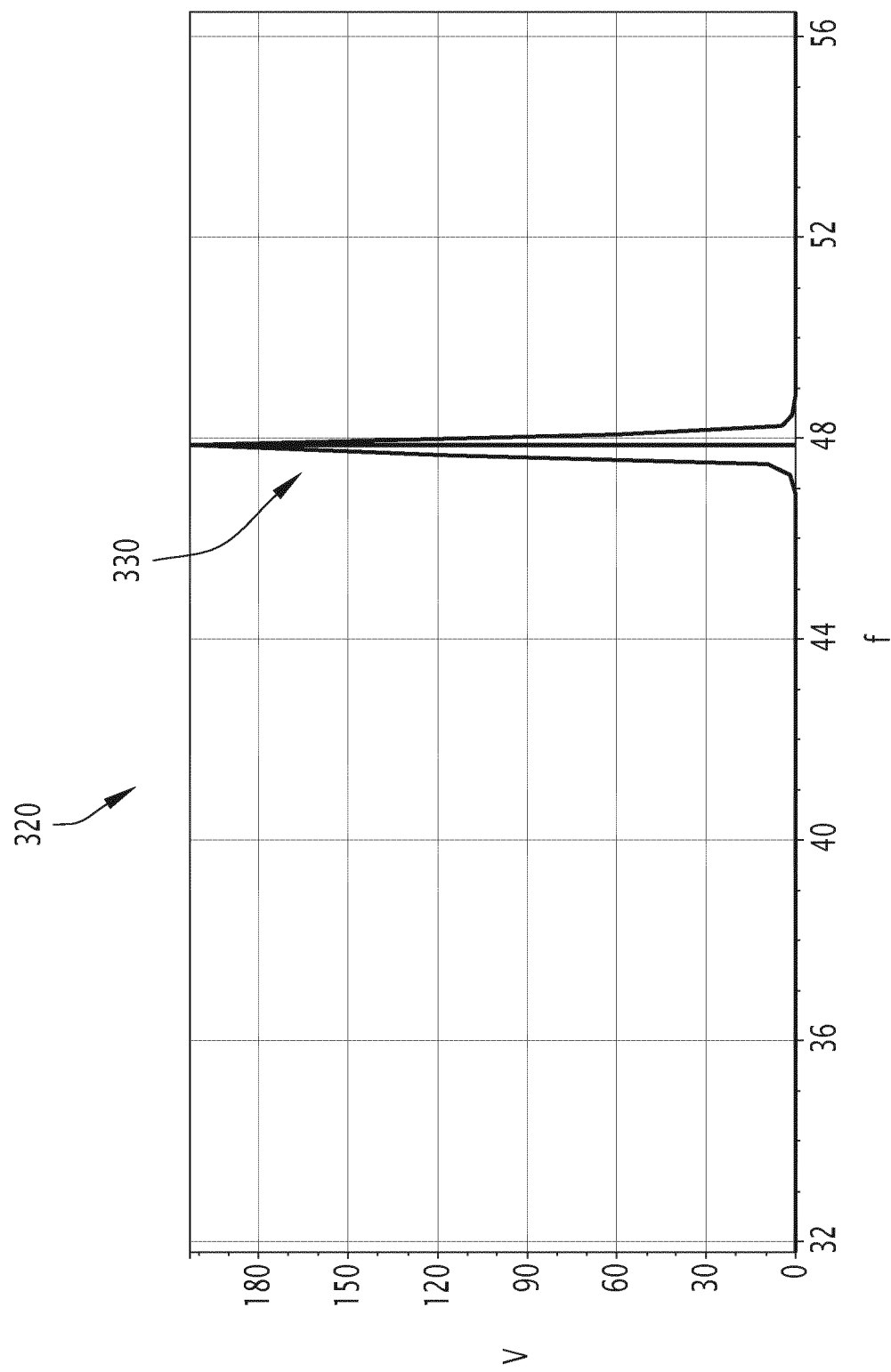
FIG. 4 is a second example of frequency spectrum measured during the method of FIG. 2.

A second example of the frequency spectrum 320 representing the values of speed v (in millimeters per second) calculated as a function of the associated frequency f (in hertz) is shown in FIG. 4. This second example of the spectrum corresponds to a support 20 not supporting no body 22, therefore at zero mass of the body 22. There is a peak 330 entered around a frequency of 47.87 Hz. We deduce that, when the first frequency is equal to 47.87 Hz, the mass of body 22 is zero.

As may be seen from the comparison of the spectra 300 and 320, a variation in the mass of the body 22 results in a significant variation in the first frequency.

Comparing the first frequency to the first frequency threshold is a simple way to estimate the body mass 22. When the first frequency is compared to multiple frequency thresholds, the estimate of the mass is more accurate.

Calculating the coefficients of a Fourier transform is a fast and efficient way to determine a frequency.

A second example of the device 10 will now be described. The elements identical to the first example of device 10 are not described again. Only the differences are highlighted.

The control module 40 is designed to apply frequency filtering to the calculated speed values to obtain filtered speed values.

Filtering is, for example, bandpass filtering. Alternatively, the filtering may be high pass filtering.

The control module 40 is further designed to calculate the coefficient values of the Fourier transform from the filtered speed values.

The control module 40 is further designed to compare the values of coefficients with a threshold of coefficients, and to estimate the mass as a function of the result of the comparison.

For example, the control module 40 may be designed to generate the first signal when at least one coefficient has an absolute value greater than or equal to the threshold of coefficients.

The second example has the advantage of allowing a reduced processing time of the acceleration values, and thus of accelerating the emission of the signal(s). Thus, the mass measurement is more precise.

The invention claimed is:

1. A device for measuring a mass of a body, the device comprising:
   a support suitable for supporting the body;
   a frame;
   an actuator designed to vibrate said support relative to said frame;
   an accelerometer configured to measure values of acceleration of said support during a vibration of said support; and
   an electronic control module configured to calculate speed values of said support relative to said frame from the acceleration values measured by said accelerometer and to estimate the mass of the body from the speed values.

2. The device according to claim 1, wherein said control module is further configured to determine a vibration frequency of said support relative to said frame from the calculated speed values, and to estimate the mass of the body from the vibration frequency.

3. The device according to claim 2, wherein said control module is further configured to compare the vibration frequency with at least a first predetermined threshold, and to estimate the mass of the body based on the comparison.

4. The device according to claim 3, wherein said control module is further configured to generate, when the vibration frequency is greater than or equal to the at least one first threshold, a signal intended for a user of the device.

5. The device according to claim 2, wherein said control module is further configured to compare the vibration frequency with a plurality of first predetermined thresholds, and to estimate the mass of the body based on each comparison.

6. The device according to claim 2, wherein said control module is further configured to calculate speed values of said support relative to said frame from the acceleration values measured by said accelerometer, to calculate values of coefficients of a Fourier transform of the speed values, and to determine the vibration frequency from the calculated coefficient values.

7. The device according to claim 2, wherein said control module is further configured to:
apply frequency band-pass filtering to the speed values,
calculate the coefficient values of a Fourier transform of the filtered speed values,
compare an absolute value of each calculated coefficient value with a second predetermined threshold, and
estimate the mass, to generate a signal to a user, based on the result of the compare.

8. The device according to claim 1, wherein said actuator configured to move said support in a specific direction relative to said frame while said actuator is vibrating said support, and wherein said accelerometer is configured to measure acceleration values of said support in the specific direction.

9. The device according to claim 1, wherein the body is a reserve of a product, and wherein the device further comprises a sprayer configured to receive a stream of the product from the reserve and to spray the product received.

10. The device of claim 1, wherein said actuator comprises:
a shaft, and
an electric motor, configured to rotate said shaft for vibrating said support relative to said frame.

11. The device of claim 1, further comprising one or more dampers, connecting said support to said frame, wherein a deformation of said one or more dampers allows relative movement of said support relative to said frame.

12. The device of claim 1, wherein the vibration has a first temporal frequency less than or equal to 100 Hz.

13. A method of measuring a mass of a body, implemented by a measuring device comprising a support supporting the body, a frame, and an actuator configured to vibrate the support relative to the frame, the method comprising:
vibrating, by the actuator, the support relative to the frame;
measuring, by an accelerometer, values of acceleration of the support during said vibrating;
calculating, by an electronic control module, speed values of the support relative to the frame from the acceleration values measured by the accelerometer; and
estimating, by the electronic control module, the mass of the body from the speed values.

14. A method of spraying a product, implemented by a device according to claim 9, the support of the device supporting a reserve of the product, the method comprising:
circulating the product from the reserve to the sprayer of the device;
spraying, by the sprayer, the product received; and
applying the method of claim 13 for measuring the mass of a body, the body being the reserve of the product.

15. The device of claim 9 wherein the product is a powder.

16. The method of claim 14 wherein the product is a powder.

17. The method of claim 13, wherein the vibration has a first temporal frequency less than or equal to 100 Hz.

* * * * *